Dec. 31, 1968   R. N. HARRISON ET AL   3,419,862
P.P.I. RADAR APPARATUS
Filed Sept. 29, 1967

United States Patent Office 3,419,862
Patented Dec. 31, 1968

3,419,862
P.P.I. RADAR APPARATUS
Robert Neal Harrison, Camberley, and Kenneth Lockhart Richardson, Stanwell, England, assignors to The Solartron Electronic Group Limited, Farnborough, Hampshire, England, a corporation of Great Britain
Filed Sept. 29, 1967, Ser. No. 671,734
2 Claims. (Cl. 343—7.7)

ABSTRACT OF THE DISCLOSURE

In P.P.I. radar apparatus, permanent echoes are removed from the display by selecting M.T.I. signals for display only in those regions where permanent echoes exist. A signal generator generates switching pulses in synchronism with the display and corresponding to permanent targets and these are applied to effect selection of normal or M.T.I. radar signal for display by means of a selector switch.

---

The present invention relates to radar apparatus for providing a plan position indication (P.P.I.) display and is concerned with eliminating permanent echoes from the display.

The moving target indication (M.T.I.) method of distinguishing moving targets from permanent echoes, depending on the movement of the targets, has two disadvantages. Firstly, to be effective the movement must have a radial component. Secondly, there are speeds at which the movement is not detected by the M.T.I. circuit. There are known as "blind speeds."

The "blind speed" problem has been largely overcome by using staggered pulse repetition frequencies (P.R.F.'s), but the problem known as tangential fade, occurring when there is zero radial component of motion of an aircraft relative to the radar station, remains. It may occur over a sector of considerable width when an aircraft is flying nearly tangential.

The usual method of reducing the effect of tangential fade is to use the M.T.I. signals from a range that will eliminate most of the permanent echoes and to use normal radar, that is without M.T.I. operation, outside this range. In this way there will be no tangential fade for targets in the range over which the normal radar is operative. Often the permanent echoes occur at considerable distances from the origin of the picture so the range over which M.T.I. is used must be a compromise. Reducing the range of M.T.I. used is not very satisfactory as it produces unacceptable permanent echoes in parts of the picture.

The principal object of the present invention is to provide improved P.P.I. radar apparatus in which the effects of the elimination of permanent echoes can be reduced to a minimum in the display without the need for the compromise referred to.

According to the present invention, radar apparatus for providing a P.P.I. display includes means for deriving first, plan position signals of all targets within a predetermined region, second, plan position signals representative solely of moving targets in the said region, means for generating pulses representative solely of permanent echoes in the said region, a selector switch whereby either the first or second P.P.I. signals can be applied to a P.P.I. indicator and means for applying the said pulses so to operate the selector switch that the first P.P.I. signals are applied to the P.P.I. indicator when representative of targets spaced from permanent echoes and the second P.P.I. signals are applied to the P.P.I. indicator when they coincide with permanent echoes.

One embodiment of the invention will now be described, by way of example, with reference to the accompanying drawings, in which.

Figure 1:
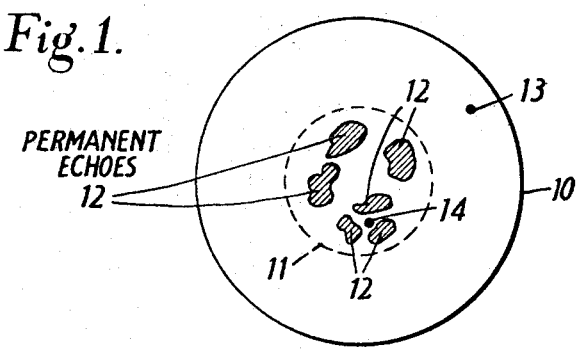
FIG. 1 shows a P.P.I. display with echoes from permanent and moving targets.

Referring to FIG. 1, this shows diagrammatically a P.P.I. display within a region indicated by a circule 10 from normal radar. In a region indicated by a broken line 11 and relatively close to the center of the display is a number of permanent echoes 12.

A moving target 13 is relatively remote from the permanent echoes and is easily visible on the display. A moving target 14 is relatively close to the permanent echoes 12 and may easily escape detection by an operator.

Figure 2:
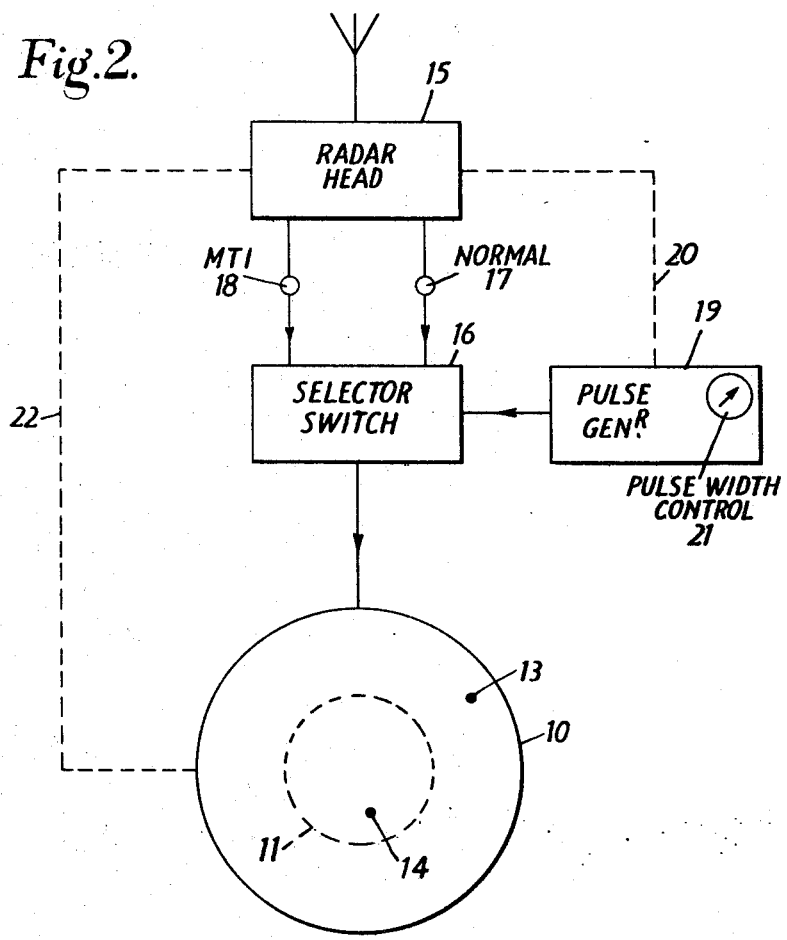
FIG. 2 shows, in block form, a known arrangement for removing at least some permanent echoes from a P.P.I. display.

Referring to FIG. 2, this shows a block diagram of a known assembly of apparatus for improving the visibility of some moving targets.

A radar head 15 functions in a known manner to provide normal radar signals at an output terminal 17 and M.T.I. signals at an output terminal 18. The terminals 17 and 18 are connected to two inputs respectively of a selector switch 16 and a pulse generator 19 is connected to the selector switch for controlling its operation.

The output of the selector switch 16 is connected to the display apparatus 10 whereby either normal or M.T.I. radar signals can be displayed. As indicated by a broken line 22 the scanning circuits (not shown) of the display apparatus are synchronized to the scanning of the radar head 15. Similarly as indicated by a broken line 20 the pulse generator 19 is synchronized with the radar head 15. The pulse generator 19 is adapted for generating pulses of variable width in dependence upon the setting of a control 21.

The pulse generator 19 is so synchronized to the radar head that a pulse is generated when the pulse from the radar head is sent out. The width of the pulse generated by the pulse generator 19 is so adjusted by means of the pulse width control 21 that the pulse ends at an instant corresponding to a range indicated by a broken line 11 in FIG. 2. When the pulse is applied to the selector switch 16, it causes M.T.I. signals from 18 to be fed to the display. When no such pulse is applied to the selector switch 16 normal signals from 17 are fed to the display.

Thus within the range indicated by the broken line 11 permanent echoes are suppressed and the only echoes displayed are echoes from moving targets with an adequate radial component of motion. Outside the range indicated by the line 11 the display is of normal radar returns.

It will be appreciated that this known arrangement will make many moving targets readily visible which might otherwise be obscured by the permanent echoes.

However it does not solve the problem of tangential fade within the range 11.

Figure 3:
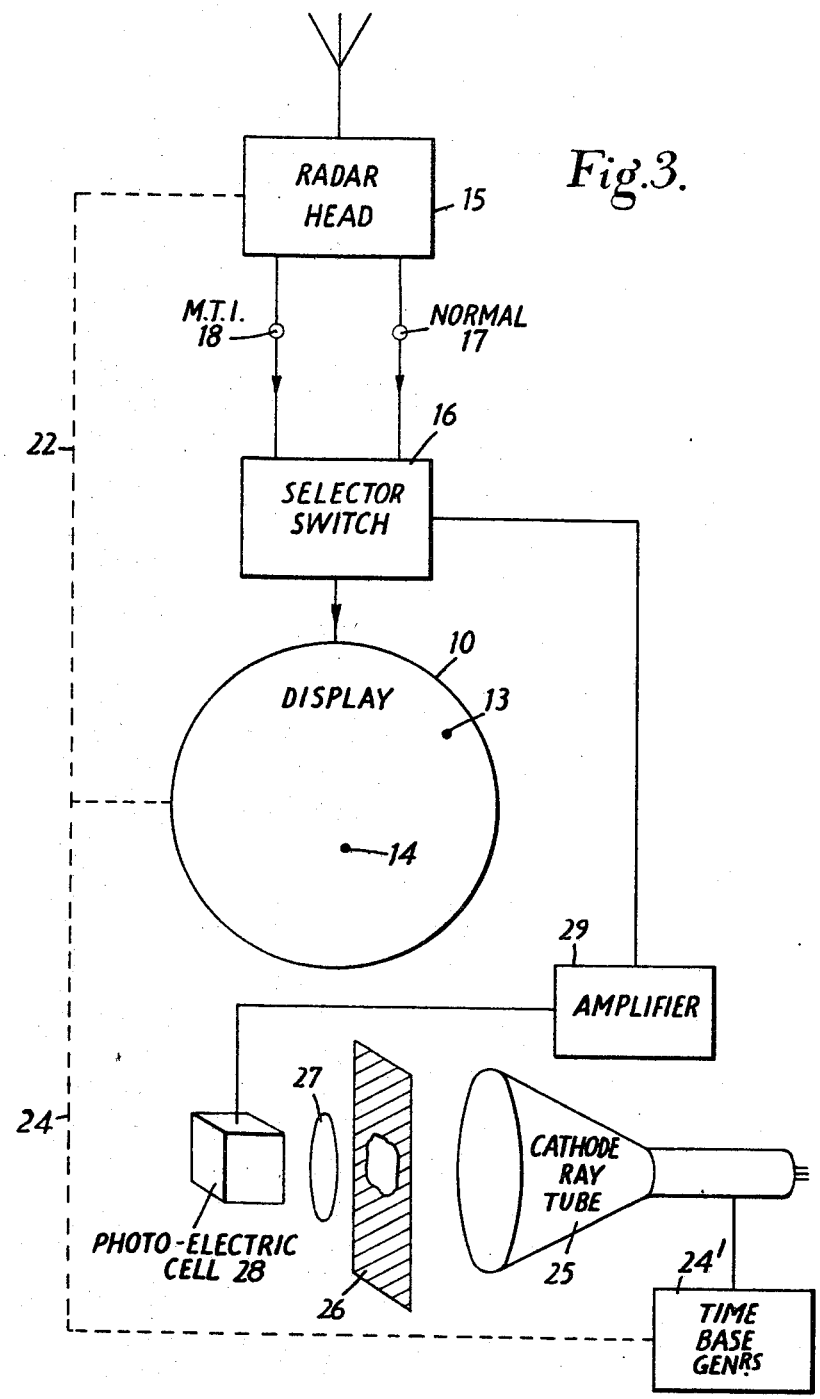
FIG. 3 shows, in block form, an embodiment of the invention.

Referring to FIG. 3 this shows a block diagram of an embodiment of the invention. A radar head 15 provides normal radar signals at an output terminal 17 and M.T.I. signals at an output terminal 18. The terminals 17 and 18 are connected to two inputs respectively of a selector switch 16. The output of the selector switch 16 is connected to a display 10 whereby either normal or M.T.I. signals can be displayed. As indicated by a broken line 22 the scanning circuits (not shown) of the display apparatus are synchronized to the scanning of the radar head 15. This much is common to both the apparatus as described hereinbefore with reference to FIG. 2 and the embodiment of the invention.

A cathode-day tube flying-spot scanner 25 has time base generators 24′ synchronized with the radar head 15 as indicated by the broken line 24. In front of the fluorescent screen of the cathode-ray tube 25 is a map of permanent echoes 26. An optical system 27 is placed between the map and a photoelectric cell 28. The output of the photoelectric cell 28 is connected to the input of an amplifier 29 and the output of the amplifier 29 is connected to an input of the selector switch 16.

The time base generators 24′ are so synchronized with the radar head 15, that light from the fluorescent screen of the cathode-ray tube 25 scans a position on the map of the permanent echoes at a time when the radar head 15 is scanning the site to which the position on the map corresponds.

The map 26 represents areas that are permanent echoes by optically transparent regions and areas that are spaced from permanent echoes by optically opaque regions.

The optical system 27 focuses the light transmitted by the map 26 on the photoelectric cell 28. When light falls on the photoelectric cell 28, a pulse of electricity is generated which is amplified by the amplifier 29 and then fed into the input of the selector switch 16. Light will fall on the photoelectric cell 28 only while scanning positions on the map 26 that are optically transparent, that is, positions that represent permanent echoes. Consequently a pulse is generated only while scanning positions where there are permanent echoes. When scanning positions spaced from permanent echoes no light falls on the photoelectric cell 28 and no pulse is generated. The pulses which are generated by the cell 28 are arranged to be of constant amplitude. When there are no pulses there is zero E.M.F. In the amplifier the positive E.M.F's of the pulses are maintained as positive, but the zero E.M.F. becomes a negative E.M.F. In other words the D.C. component is removed. The pulses when applied to the selector switch 16 cause M.T.I. signals from 18 to be fed to the display, and when there are no pulses the selector switch 16 feeds normal radar signals from 17 to the display. M.T.I. is selected only where there are permanent echoes. The permanent echoes are suppressed and the only echoes shown on the display are echoes from moving targets. Thus the area of the display over which tangential fade can occur is less than it is on the display of the apparatus hereinbefore described with reference to FIGURE 2. Thus a moving target 14 is easily visible, and the only positions where there is any likelihood of tangential fade occurring are positions where there are permanent echoes.

Figure 4:
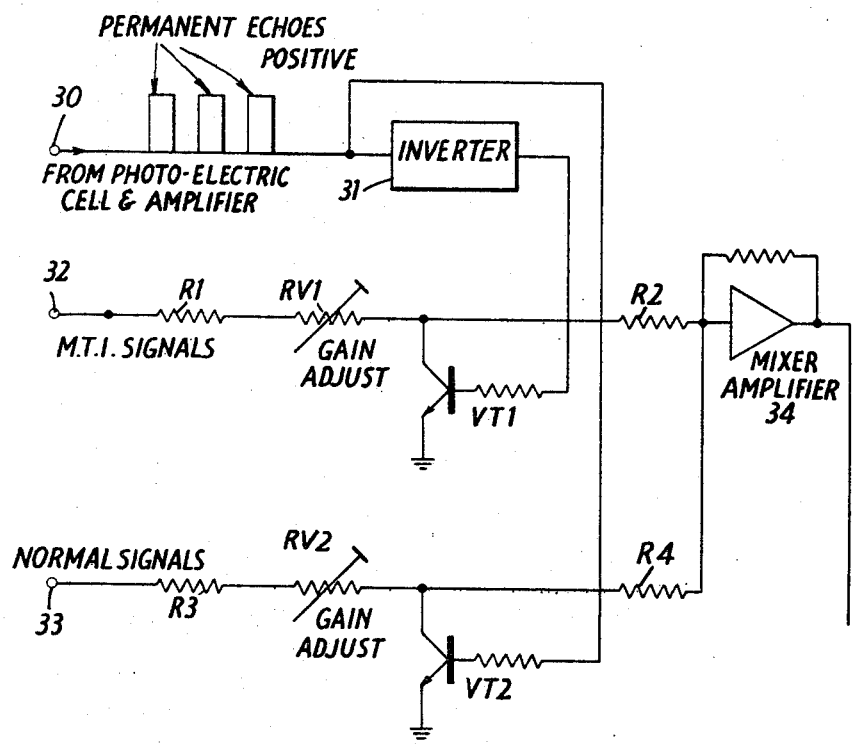
FIG. 4 shows a circuit diagram of a selector switch employed in the embodiment of FIG. 3.

Referring to FIG. 4, this shows a circuit diagram of a selector switch suitable for use in the embodiment of FIG. 3. One input 30 of the selector switch receives pulses from the photoelectric cell and amplifier of FIG. 3. It is connected to the base of a shunt-connected transistor VT2 and to an inverter 31 the output of which is connected to the base of a shunt-connected transistor VT1. A second input 32 receives M.T.I. signals from the radar head 15 of FIG. 3 and is connected in series with a resistor R1 and a variable resistor RV1. The variable resistor RV1 is connected both to a resistor R2 and the collector of the transistor VT1. A third input 33 receives normal radar signals from the head 15 of FIG. 3 and is connected in series with a resistor R3 and a variable resistor RV2. The variable resistor RV2 is connected both to a resistor R4 and the collector of the transistor VT2. The resistors R2 and R4 are both connected to the input of a mixer amplifier 34. The MT1 signals, when selected, are taken by the resistive path R1, RV1 and R2 to the input of the mixer amplifier 34. The normal signals, when selected, are taken by the resistive path R3, RV2 and R4 to the input of the mixer amplifier 34.

When a positive-going E.M.F. is applied to the input 30, a positive-going E.M.F. is applied to the base of the transistor VT2 which causes it to become fully conducting, and a negative-going E.M.F. is applied to the base of the transistor VT1 which causes it to become nonconducting. Thus VT2 provides a short-circuit and only M.T.I signals pass to the mixer amplifier 34. When a negative-going E.M.F. is applied to the input, a negative-going E.M.F. is applied to the base of the transistor VT2 causing it to become nonconducting and a positive-going E.M.F. is applied to the base of the transistor VT1 causing it to become fully conducting. VT1 thus provides a short-circuit and only normal radar signals pass to the mixer amplifier 34.

The variable resistors RV1 and RV2 are gain controls and enable the amplitudes of the M.T.I. and the normal signals so to be matched that there is no undesirable and sudden variation in the amplitude of the signals fed to to the display when the selector switch changes selection from M.T.I. to normal or normal to M.T.I.

The selector switch enables M.T.I. signals to be selected for display when there are pulses and normal radar signals when there are no pulses. The response-time of the selector switch is sufficiently short to meet the operational requirements of the radar apparatus.

We claim:

1. Radar apparatus for providing a P.P.I. display comprising in combination:
    (a) first means for deriving first plan position signals of all targets within a predetermined region,
    (b) second means for deriving second plan position signals representative solely of moving targets in the said region,
    (c) a P.P.I. display device,
    (d) a selector switch connected between said first and second means and said display device whereby either of the said first and second signals can be selected for display,
    (e) means for generating third signals representative solely of permanent targets in the said region, and
    (f) means for applying said third signals to said selector switch to cause the second signals to be selected for application to said display device only when they coincide with said permanent targets.

2. Radar apparatus as claimed in claim 1, wherein the said means for generating the third signals comprise:
    (g) a flying spot scanner,
    (h) means for synchronizing said flying spot scanner with said display device,
    (i) a map of permanent targets in the said region arranged to be scanned by said flying spot scanner, and
    (j) a light-responsive device responsive to the scanning of said map by said scanner to generate said third signals.

References Cited

UNITED STATES PATENTS 2,905,938  9/1959  Matthews _____ 343—7.7
3,080,557  3/1963  Davis et al. _____ 343—7.7

RODNEY D. BENNETT, *Primary Examiner.*

M. F. HUBLER, *Assistant Examiner.*